(12) United States Patent
Kalya et al.

(10) Patent No.: US 9,639,071 B2
(45) Date of Patent: May 2, 2017

(54) METHOD AND SYSTEM FOR COMBUSTION MODE TRANSFER FOR A GAS TURBINE ENGINE

(71) Applicant: General Electric Company, Schenectady, NY (US)

(72) Inventors: Prabhanjana Kalya, Hyderabad (IN); Steven William Backman, Simpsonville, SC (US); Laura Lea Boes, Greenville, SC (US); David Spencer Ewens, Greer, SC (US); Trevor Valder Jones, Greenville, SC (US)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 14/149,349

(22) Filed: Jan. 7, 2014

(65) Prior Publication Data

US 2015/0192912 A1    Jul. 9, 2015

(51) Int. Cl.
| | |
|---|---|
| *G05B 11/42* | (2006.01) |
| *G05B 15/02* | (2006.01) |
| *G06Q 50/06* | (2012.01) |
| *G05B 15/00* | (2006.01) |

(52) U.S. Cl.
CPC .................................. *G05B 15/00* (2013.01)

(58) Field of Classification Search
CPC ... F02C 7/228; F02C 9/00; F02C 9/26; G05B 19/41875; G01N 21/3581; G01N 21/3559; G01N 33/346; G01N 21/86; G01B 11/0625; G01B 11/06

See application file for complete search history.

(56) References Cited

U.S. PATENT DOCUMENTS

| | | | | |
|---|---|---|---|---|
| 4,765,133 | A | * | 8/1988 | Krukoski ................. F02C 9/28 60/39.281 |
| 5,402,634 | A | * | 4/1995 | Marshall ................ F02C 7/232 60/734 |

(Continued)

FOREIGN PATENT DOCUMENTS

| | | |
|---|---|---|
| EP | 2549081 A1 | 1/2013 |

OTHER PUBLICATIONS

Great Britain Combined Search and Examination Report for related matter GB1422795.3 dated Jun. 4, 2015; 6 pp.

*Primary Examiner* — Ronald Hartman, Jr.
(74) *Attorney, Agent, or Firm* — Armstrong Teasdale LLP

(57) ABSTRACT

A method and system for transferring between combustion modes in a gas turbine engine is provided. A processor generates data representative of an initial set of splits for providing at least one of fuel and air to at least one combustor in the gas turbine engine. A gas turbine engine model module generates data representative of at least one engine operating condition. A first split calculation module generates data representative of at least one set of active control splits to control the engine in a first combustion mode, using as an input the initial split data. A second split calculation module generates data representative of at least one set of passive control splits to control the engine in at least a second combustion mode. Transfer between combustion modes may be accomplished via use of at least one of the active control splits and the passive control splits.

19 Claims, 5 Drawing Sheets

(56) References Cited

U.S. PATENT DOCUMENTS

| | | | |
|---|---|---|---|
| 5,916,126 A * | 6/1999 | Szillat | F02C 7/26 60/778 |
| 6,282,884 B1 * | 9/2001 | Adibhatla | F02C 9/28 60/39.281 |
| 8,417,433 B2 | 4/2013 | Gauthier et al. | |
| 8,566,001 B2 | 10/2013 | Stuttaford et al. | |
| 2002/0002819 A1 * | 1/2002 | Gorman | F01K 23/106 60/784 |
| 2010/0175385 A1 * | 7/2010 | Plant | F02C 3/10 60/773 |
| 2010/0300108 A1 | 12/2010 | Demougeot et al. | |
| 2011/0270502 A1 | 11/2011 | Demougeot et al. | |
| 2012/0036861 A1 * | 2/2012 | Seely | F02C 9/28 60/776 |
| 2012/0078567 A1 * | 3/2012 | Ewens | F02C 9/28 702/130 |
| 2012/0275899 A1 | 11/2012 | Chandler | |
| 2014/0165581 A1 * | 6/2014 | Terry | F02C 9/00 60/772 |

* cited by examiner

METHOD AND SYSTEM FOR COMBUSTION MODE TRANSFER FOR A GAS TURBINE ENGINE

BACKGROUND

The present disclosure relates to control of a gas turbine engine, and more specifically, to methods and systems for controlling a transfer between combustion modes while a gas turbine engine is under combustion direct boundary control.

In at least some known gas turbine systems, a type of control referred to as combustion direct boundary control is used to regulate flows of fuel and air to the various nozzles of the one or more combustors within a gas turbine engine. As used herein, "combustion direct boundary control" refers to the regulation of combustion within a gas turbine engine, e.g., via controlling the flows of air and/or fuel to nozzles in combustors within the engine, such that one or more predetermined combustion parameters, including but not limited to, temperatures, pressures, dynamics, and/or concentrations of combustion byproducts, are maintained within predetermined boundaries or limits. In at least some known gas turbine systems, the gas turbine engine includes a plurality of combustors, and each combustor includes a plurality of nozzles. In at least some such gas turbine systems, the flows of fuel and/or air are supplied to the individual nozzles via individual fuel and air supply circuits that can be controlled independently of each other. One way the amounts of air and/or fuel that are supplied to an individual nozzle within a combustor can be defined is by determining the total air and/or fuel required to be delivered to the gas turbine engine or combustor, then defining the amounts of fuel and/or air supplied to individual nozzles (sometimes referred to as "splits"). The "split" for a given nozzle defines the fraction of the total required fuel flow to the gas turbine engine or combustor to be delivered via the given nozzle. Accordingly, during combustion direct boundary control, a split being channeled to one nozzle may be different than a split being channeled to another nozzle within the same combustor.

During combustion direct boundary control, a control system for a gas turbine system uses one or more closed-loop feedback loops to adjust the splits supplied to the nozzles. Each loop can be defined by a boundary parameter. Boundary parameters can include, but are not limited to, predetermined numerical values or ranges for gas turbine emissions such as NOx, CO, etc., combustion system dynamics, and/or any combustor operability characteristics, including parameters indicative of lean blowout. For each feedback loop, the commanded split output is a function of a defined limit or target for the boundary parameter, feedback on the current value of the boundary parameter, and the current split. The feedback on the current boundary parameter can be obtained via a direct measurement of the boundary parameter, a modeled estimate of the boundary parameter, or a combination of both. Further priority logic can further downselect from a plurality of feedback loop splits to define the final commanded split for the given nozzle.

In at least some known gas turbine systems, the gas turbine engine is capable of being operated in several different combustion modes. The different combustion modes, which for purposes of this disclosure may be identified via numbers (1, 2, 3, etc.) and/or letters (A, B, C, . . . , X, Y, Z, etc.), are differentiated from each other with respect to the amounts of fuel and/or air supplied to each nozzle within a combustor and/or with respect to the amounts of fuel and/or air supplied to the respective combustors within the gas turbine engine. More specifically, the different combustion modes determine which nozzles will be enabled (i.e., supplied with some amount of fuel and/or air), and which nozzles will be disabled (i.e., not supplied with fuel and/or air).

In at least some known gas turbine systems, the different combustion modes may be required to operate the gas turbine engine optimally across a range of operating conditions. This range of operating conditions includes different loading conditions imposed on the gas turbine engine. Accordingly, one combustion mode may correspond to a low load mode, another combustion mode may correspond to a mid-load mode, and still another combustion mode may correspond to a high load mode. These are examples only, and in at least some known gas turbine systems, different combustion modes may be associated with other criteria of concern. In addition, there may exist secondary factors that may affect the choice of combustion mode for a given gas turbine operating condition, such as ambient conditions, gas turbine conditions, etc.

In such gas turbine systems that are capable of operation in multiple combustion modes, it may be desirable to transfer from one combustion mode to another while the gas turbine engine is being continuously operated. However, in such known gas turbine systems, it has not been possible to transfer between combustion modes while still operating under combustion direct boundary control conditions. This is because some of the boundary measurements used directly for control and/or as input into the models for unmeasured boundary parameters used for control are dependent on the current combustion mode. As such, these measurements cannot be used to accurately predict the passive splits. Therefore, it is necessary for the control system to exit combustion direct boundary control and refer to an open loop split schedule without direct feedback loops. Open loop splits can be scheduled based on a measured or modeled combustion reference parameter, one that is not dependent on the combustion mode, and will usually be stored in memory within the control system, that contain splits that correspond to various combustion modes under different operating conditions in order to implement a change between combustion modes. After initial or "landing spot" splits have been retrieved from a split schedule, and the related measurements fully reflect the gas turbine operating in the new combustion mode, then combustion direct boundary control operation of the gas turbine engine can be resumed. However, this method has several disadvantages. First is the lack of robustness in running to open loop schedules and added risk of potentially violating a boundary limit when direct boundary control is disabled. Secondarily, determining and maintaining numerous split schedules for different combustion modes and different conditions (e.g., different load paths or exhaust temperatures) for each mode may be labor-intensive and expensive, as the generation and maintenance of predetermined split schedules for a gas turbine engine involves the use of maintenance personnel for repeated periodic onsite tuning of the gas turbine engine.

BRIEF DESCRIPTION

In an aspect, a method for use in transferring between combustion modes in a gas turbine engine is provided. The method is implemented using a computing device including a processor coupled to a memory device The method includes generating, with the computing device, data representative of an initial set of splits for providing at least one of fuel and air to at least one combustor in the gas turbine engine. The method also includes generating, with the computing device, a model of the gas turbine engine, wherein the gas turbine engine model generates as an output data representative of at least one operating condition within the gas turbine engine. The method also includes generating, with a first split calculation module within the computing device, data representative of at least one set of active control splits for use in controlling the gas turbine engine in a first combustion mode, using as an input the initial split data. The method also includes generating, with at least a second split calculation module within the computing device, data representative of at least one set of passive control splits for use in controlling the gas turbine engine in at least a second combustion mode, using as an input, a self-generated set of control split data.

In another aspect, a system for transferring between combustion modes in a gas turbine engine is provided. The system includes a computing device including a processor, and a computer-readable storage device having encoded thereon computer-readable instructions that are executable by the processor. The computer-readable instructions cause the processor to generating data representative of an initial set of splits for providing at least one of fuel and air to at least one combustor in the gas turbine engine. The computer-readable instructions further cause the processor to generate a model of the gas turbine engine, wherein the gas turbine engine model generates as an output data representative of at least one operating condition within the gas turbine engine. The computer-readable instructions further cause the processor to generate, with a first split calculation module within the computing device, data representative of at least one set of active control splits for use in controlling the gas turbine engine in a first combustion mode, using as an input the initial split data. The computer-readable instructions further cause the processor to generate, with at least a second split calculation module within the computing device, data representative of at least one set of passive control splits for use in controlling the gas turbine engine in at least a second combustion mode, using as an input, a self-generated set of control split data. The computer-readable instructions further cause the processor to transfer between combustion modes via utilization of active control splits captured at a beginning of a combustion mode transfer and passive control splits continuously calculated during the combustion mode transfer, such that the active control splits at the beginning of the transfer are incrementally adjusted to approach the passive control splits.

In another aspect, a gas turbine system is provided. The gas turbine system includes a compressor section, a combustor assembly coupled to the compressor section, a turbine section coupled to the compressor section, and a control subsystem. The control subsystem includes a processor, and a computer-readable storage device having encoded thereon computer-readable instructions that are executable by the processor. The computer-readable instructions cause the processor to generate data representative of an initial set of splits for providing at least one of fuel and air to at least one combustor in the gas turbine engine. The computer-readable instructions further cause the processor to generate a model of the gas turbine engine, wherein the gas turbine engine model generates as an output data representative of at least one operating condition within the gas turbine engine. The computer-readable instructions further cause the processor to generate, with a first split calculation module within the computing device, data representative of at least one set of active control splits for use in controlling the gas turbine engine in a first combustion mode, using as an input the initial split data. The computer-readable instructions further cause the processor to generate, with at least a second split calculation module within the computing device, data representative of at least one set of passive control splits for use in controlling the gas turbine engine in at least a second combustion mode, using as an input, a self-generated set of control split data. The computer-readable instructions further cause the processor to transfer between combustion modes after the computing device determines that a threshold of a monitored operating condition exceeds a predetermined threshold value.

DETAILED DESCRIPTION

Figure 1:
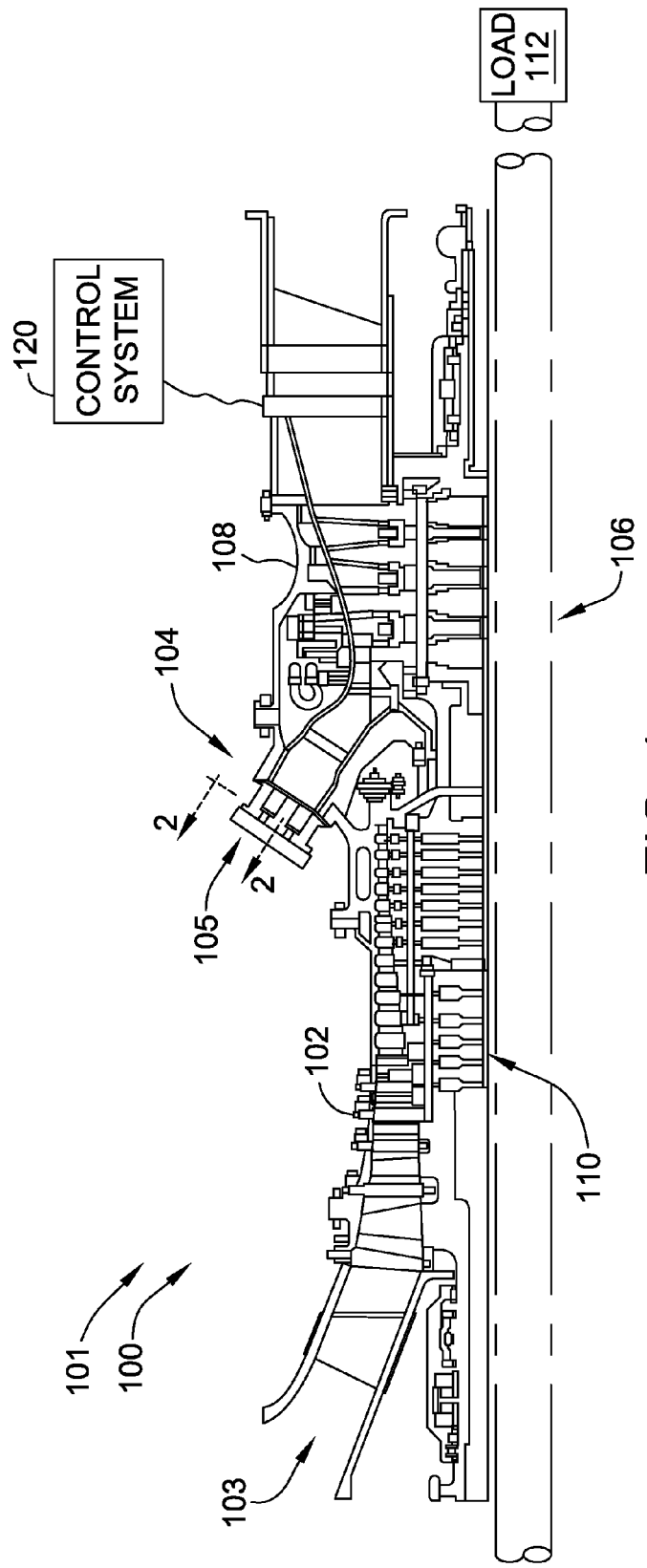
FIG. 1 is schematic diagram of an exemplary gas turbine system.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, "operating conditions" refers to one or more numerical values for physical parameters in effect during operation of a gas turbine engine, such as, but not limited to, exhaust manifold temperature and pressure, compressor pressure, compressor temperature, engine output, fuel flow, and inlet air temperature. Some operating conditions, such as exhaust manifold temperature and pressure, may be directly measured, e.g., via appropriately placed sensors coupled to a suitably programmed computing device. Other operating conditions, such as combustion pressure and temperature, are difficult to measure reliably using a direct measurement, but may be estimated via calculations performed by the computing device, based on mathematical models utilizing other parameters that are measurable.

The present disclosure relates to the control of a gas turbine engine, particularly through the use of combustion direct boundary control techniques. Combustion direct boundary control techniques include the use of a closed-loop feedback method of controlling a gas turbine engine through the use of one or more sensors for feedback and the use of one or more actuators for control of the gas turbine engine operation. However, at least some known gas turbine engines are capable of operation in a plurality of combustion modes that correspond to different combinations of fuel and/or air supplied to individual nozzles within the combustors and/or to different combinations of fuel and/or air supplied to different combustors, within the gas turbine engine. Each combustion mode may involve the supply of fuel and air in different amounts not only to each combustor within a gas turbine engine, but also in different amounts, including no fuel and/or air, to each nozzle within each combustor.

As described above, the amount of fuel and/or air being supplied to a nozzle is referred to as a "split." Accordingly, in at least some known gas turbine systems, the combination of splits used in one combustion mode (for example, mode "X"), are different than the combination of splits used in another combustion mode (for example, mode "Y"). Note that the determination of splits depends on both the combustion mode of operation and on the direct boundary control logic utilized for the given combustion mode.

In at least some known gas turbine systems, it is not possible to operate the gas turbine engine via substantially continuous combustion direct boundary control, while transferring from one combustion mode to another. Instead, a control system of a gas turbine system maintains a set of schedules of fuel/air splits correlated to combustion reference parameters, to provide for initial "target" splits that are supplied to the nozzles of a gas turbine engine at the start of operation in each combustion mode, prior to implementation, or resumption, of combustion direct boundary control. The present disclosure provides for such transfer between combustion modes in a gas turbine system, while the gas turbine engine is under substantially continuous combustion direct boundary control.

Algorithms for determining splits to be used under measured or estimated operating conditions within a gas turbine system are known. Such algorithms include functions, sometimes referred to as "transfer functions," which are used to predict parameters used during the control of gas turbine engine operations that are not easily measurable by direct methods. The present disclosure describes a method for transferring between combustion modes in a gas turbine system by performing split calculations simultaneously in two separate processing regimes: a) an active control regime; and b) a passive control regime. An active control regime is defined as a processing regime in which the system determines what the current splits are, and uses those current splits to generate idealized control splits for real-time control of a gas turbine engine in a specific combustion mode, for example, mode X. In other words, the active control regime is the processing regime being used to control the gas turbine engine at that point in time. A passive control regime is defined as a processing regime in which splits are being calculated as if the gas turbine system were being operated in another combustion mode, for example, mode Y, but the mode Y splits are determined presuming the gas turbine engine is operating under the same operating conditions under which the active control regime splits are being calculated. In the passive control regime, the transfer functions use as a feedback input, the control splits calculated under the passive regime that would be used to control the gas turbine engine, if the engine were being operated under combustion mode Y. In other words, while the control system uses the active control regime to provide the splits used for engine operation in one combustion mode, simultaneously, the control system is calculating the splits that would be used as a steady state solution for operating the gas turbine system in another combustion mode.

In a gas turbine system in which, for example, only two combustion modes, X and Y, are available, at any given point in time one combustion mode (for example mode X) is being used in the active control regime, while the other combustion mode (mode Y) is being used in the passive control regime. For example, when during operation of the gas turbine system in mode X, the control system determines that a change to combustion mode Y is indicated, the control system can directly implement splits corresponding to steady state operation in mode Y. As a result of the transfer between combustion modes, combustion mode X becomes the passive control regime and combustion mode Y becomes the active control regime.

More specifically, and as described above, because a transfer between combustion modes requires a finite amount of time to complete, a mechanism for transferring from a pre-transfer split to a post-transfer split is provided. Without such a mechanism, there is potential for disruption of smooth operation of the gas turbine engine which may result in undesired effects that may include, but are not limited to, interruption of power generated by the engine or even shut down of the engine. In the exemplary embodiment, the gas turbine engine may be operated using the pre-transfer split until initiation of the combustion mode transfer. In the exemplary embodiment, the pre- and post-transfer split values could be statically captured at initiation of the combustion mode transfer. After the combustion mode transfer is initiated, a rate limited change between statically captured pre- and post-transfer splits can be implemented. Additionally, the rate limited change could be determined based on at least one initial numerical value difference between the pre and post-transfer splits. The difference between the numerical values of the pre and post-transfer splits may be captured at the initiation of the combustion mode transfer. This numerical difference could then be ramped (e.g., incrementally changed) to zero at a given rate, or over a given finite time, and added to the post-transfer calculated split. During the combustion mode transfer the post-transfer calculated split may be continuously calculated in passive mode since it does not require the gas turbine to be operating in the combustion mode for this second split calculation. Once the difference is ramped to zero and the related measurements fully reflect the gas turbine operating in the new combustion mode, then combustion direct boundary control operation of the gas turbine engine can be resumed utilizing the second split calculation operating in active mode.

In the embodiments described herein, two combustion modes are described. In an alternative embodiment, the control system may be configured to operate the gas turbine system in any number of combustion modes. In such a system, the combustion mode being used to determine splits being actually supplied to the combustors in the gas turbine engine is the active control regime, while splits for the other combustion modes are all calculated under the passive control regime.

FIG. 1 is a schematic illustration of an exemplary gas turbine system 101 that includes a gas turbine engine 100 and a control system 120. Engine 100 includes a compressor assembly 102 and a combustor assembly 104. Engine 100 also includes a turbine section 108 and a common compressor/turbine rotor 110.

In operation, air 103 flows through compressor assembly 102 such that compressed air is supplied to combustor assembly 104. Fuel 105 is channeled to a combustion region and/or zone (not shown) that is defined within combustor assembly 104 wherein the fuel is mixed with the air and ignited. Combustion gases generated are channeled to turbine section 108 wherein gas stream thermal energy is converted to mechanical rotational energy. Turbine section 108 is coupled to rotor 110, for rotation about an axis 106. In the exemplary embodiment, system 101 includes a load 112 that is coupled to rotor 110. Load 112 may be any device or system that uses rotational input from gas turbine engine 100, via rotor 110, to function. For example, load 112 may be, but is not limited to, an electrical generator. In the exemplary embodiment, gas turbine system 101 includes a control system 120, as described in further detail herein below.

Figure 2:
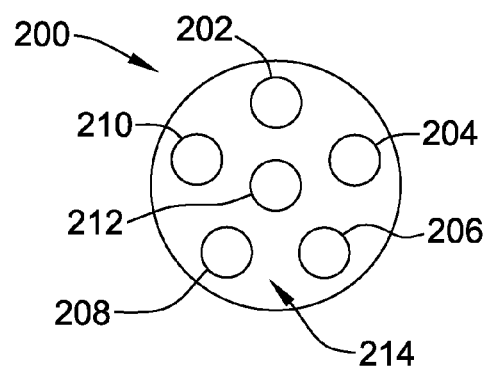
FIG. 2 is a schematic sectional view of an exemplary combustor for use in the gas turbine system shown in FIG. 1.

FIG. 2 is a schematic sectional end view of a combustor 200 that may be used in combustor assembly 104 of gas turbine engine 100 shown in FIG. 1. In the exemplary embodiment, combustor 200 includes five nozzles 202-210 arranged around a periphery 214 of combustor 200. Nozzles 202-210 surround a central nozzle 212. In an alternative embodiment, combustor 200 may include any number, arrangement and/or configuration of nozzles that enables gas turbine engine 100 to function as described herein. For example, some or all of nozzles 202-212 may be configured to deliver a single component, including but not limited to fuel and air. Alternatively, some or all of nozzles 202-212 may be configured to deliver any combination of those and/or other components. Furthermore, gas turbine engine 100 may include any number of combustors 200 that enables gas turbine engine 100 to function as described herein.

In the exemplary embodiment, fuel 105 and/or air 103 (shown in FIG. 1) may be channeled to each of nozzles 202-212 independently, such that the relative amounts (or "split") of fuel and/or air channeled to nozzle 202 may be different from the split of fuel and/or air channeled to nozzle 204, and the split of fuel and/or air channeled to nozzle 206 may be different than either of the splits channeled to nozzles 202 or 204, and so on. For example, during one combustion mode, nozzles 208 and 206 may receive only combustion air, while remaining nozzles 202, 204, 210, and 212 receive only fuel or a combination of fuel and air. In another combustion mode, all of nozzles 202-212 may receive a combination of fuel and air. These are examples only, and the disclosure is not limited to them.

Figure 3:
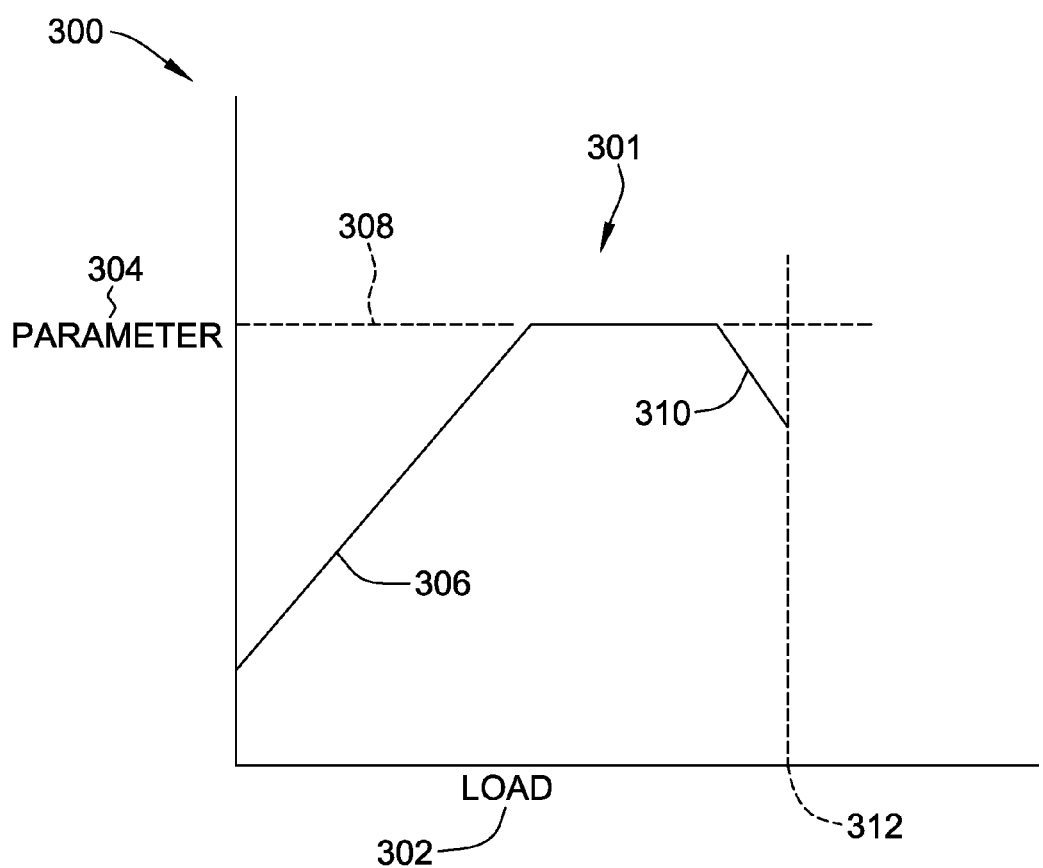
FIG. 3 is a graph of an exemplary load path for the gas turbine system shown in FIG. 1.

In the exemplary embodiment, gas turbine engine 100 (shown in FIG. 1) may be controlled by control system 120 (shown in FIG. 1) to proceed through a sequence of operating conditions that is referred to as a "load path." FIG. 3 is a graph 300 showing an exemplary generalized load path 301 of gas turbine engine 100 (shown in FIG. 1). Load path 301 is depicted in FIG. 3 as a plot of a parameter 304 of gas turbine engine 100 as a function of a load 302 imposed on gas turbine engine 100. In the exemplary embodiment, parameter 304 may be exhaust gas temperature, as sensed in an exhaust manifold (not shown) of gas turbine engine 100. Accordingly, depending upon the measurement units used, parameter 304 may have a positive non-zero value even when gas turbine engine 100 is under load 302 that is a zero load. In an alternative embodiment, parameter 304 may be any other characteristic of gas turbine engine 100 that enables gas turbine engine 100 to be controlled as described herein.

In the exemplary embodiment, as load 302 on gas turbine engine 100 increases, parameter 304 (exhaust temperature) also increases, as indicated by inclined line 306. Eventually, gas turbine engine 100 (shown in FIG. 1) will reach a state where parameter 304 has a constant value. If parameter 304 is exhaust temperature, then the state is an isothermic state, as identified by a horizontal line 308. As operation of gas turbine engine 100 continues, parameter 304 may decrease in value, as indicated by downwardly sloping line 310, until a base load 312 is reached. Base load 312 may represent a desired steady state of operation of gas turbine engine 100. For example, base load 312 may represent a state at which gas turbine engine 100 is rotating a load (i.e., a generator) 112 (shown in FIG. 1) at a desired minimum speed to produce a required minimum amount of power that can be contributed to a power grid, while operating under a specific combustion mode.

In at least some known gas turbine systems, for example in turbine systems used in combined cycle power plants, load path 301 is fixed. However, it may be desirable to enable a gas turbine engine 100 to follow a variable load path 301, for example, in response to a wide variety of variables. Such variables may include, but are not limited to, variations in ambient conditions, engine operating conditions, external load requirements, and/or fuel quality and availability. Such variables are provided simply as an example, and the disclosure is not limited thereto. Enabling gas turbine engine 100 to operate through non-fixed load paths increases the number of split schedules that must be maintained in memory in a control system 120, because each potential load path involves a different combination of operating conditions (such as exhaust temperature), that may require different combinations of fuel/air splits to be supplied to the various nozzles 202-212 of each combustor assembly 104 within gas turbine engine 100.

Figure 4:
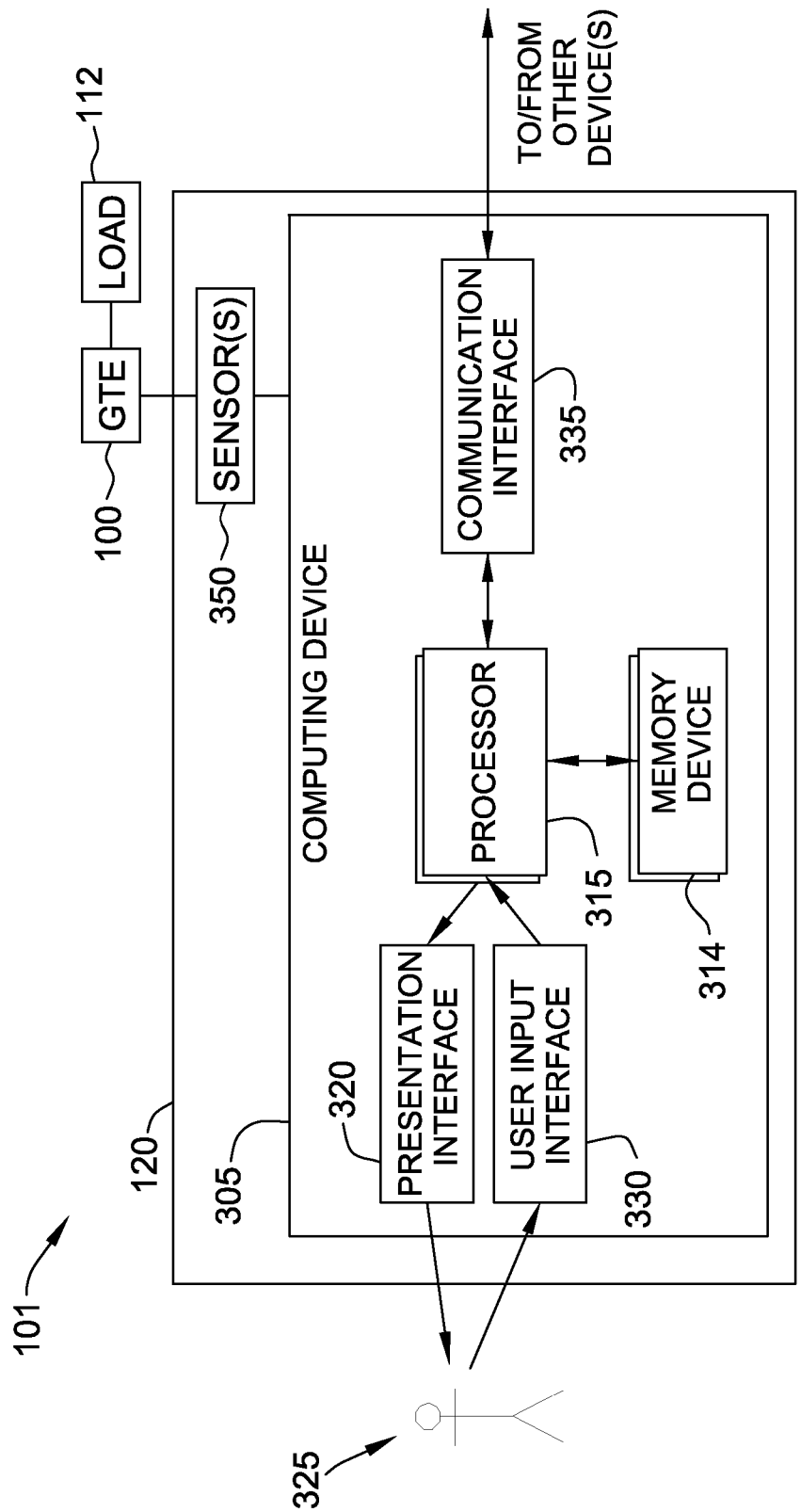
FIG. 4 is a block diagram of the gas turbine system shown in FIG. 1, illustrating an exemplary control system.

FIG. 4 is a block diagram of gas turbine system 101, showing in particular control system 120. In the exemplary embodiment, control system 120 includes a computing device 305 coupled to one or more sensors 350. Sensor(s) 350 are coupled to gas turbine engine 100 which is coupled to load 112. Control system 120 is also coupled to a plurality of physical control devices (not shown), such as valves or other flow control devices coupled in fluid communication with sources of fuel and air (not shown) supplied to gas turbine engine 100. In the exemplary embodiment, the methods and systems described herein are configured to be implemented using existing physical control devices present in at least some known gas turbine systems.

Computing device 305 is configured, using known programming techniques, for controlling gas turbine engine 100 and for transferring between combustion modes while gas turbine engine 100 is under active combustion direct boundary control. Computing device 305 includes a memory device 314 and a processor 315 operatively coupled to memory device 314 for executing instructions. Processor 315 may include one or more processing units (e.g., in a multi-core configuration). In some embodiments, executable instructions are stored in memory device 314. Computing device 305 is configurable to perform one or more operations described herein by programming processor 315. For example, processor 315 may be programmed by encoding an operation as one or more executable instructions and providing the executable instructions in memory device 314.

As used herein, the term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Memory device 314 may be configured to store operational measurements including, without limitation, real-time and historical temperature and mass flow values, and/or any other type of data. In some embodiments, processor 315 removes or "purges" data from memory device 314 based on the age of the data. For example, processor 315 may overwrite previously recorded and stored data associated with a subsequent time and/or event. In addition, or alternatively, processor 315 may remove data that exceeds a predetermined time interval. Also, memory device 314 includes, without limitation, sufficient data, algorithms, and commands to facilitate the performance of transfer function calculations for one or more combustion modes of gas turbine engine 100 (shown in FIG. 1) as described herein.

As used herein, the term "real-time" refers to at least one of the time of occurrence of the associated events, the time of measurement and collection of predetermined data, the time to process the data, and the time of a system response to the events and the environment. In the embodiments described herein, these activities and events may occur substantially instantaneously.

In some embodiments, computing device 305 includes a presentation interface 320 coupled to processor 315. Presentation interface 320 presents information, such as a user interface and/or an alarm, to a user 325. In one embodiment, presentation interface 320 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 320 includes one or more display devices.

In some embodiments, computing device 305 includes a user input interface 330. In the exemplary embodiment, user input interface 330 is coupled to processor 315 and receives input from user 325. User input interface 330 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 320 and user input interface 330.

A communication interface 335 is coupled to processor 315 and is configured to be coupled in communication with one or more other devices, such as a sensor, actuator, or another computing device 305, and to perform input and output operations with respect to such devices. For example, communication interface 335 may include, without limitation, a wired network adapter, a wireless network adapter, a mobile telecommunications adapter, a serial communication adapter, and/or a parallel communication adapter. Communication interface 335 may receive data from and/or transmit data to one or more remote devices. For example, a communication interface 335 of one computing device 305 may transmit an alarm to the communication interface 335 of another computing device 305.

Presentation interface 320 and/or communication interface 335 are both capable of providing information suitable for use with the methods described herein (e.g., to user 325 or another device). Accordingly, presentation interface 320 and communication interface 335 may be referred to as output devices. Similarly, user input interface 330 and communication interface 335 are capable of receiving information suitable for use with the methods described herein and may be referred to as input devices.

Figure 5:
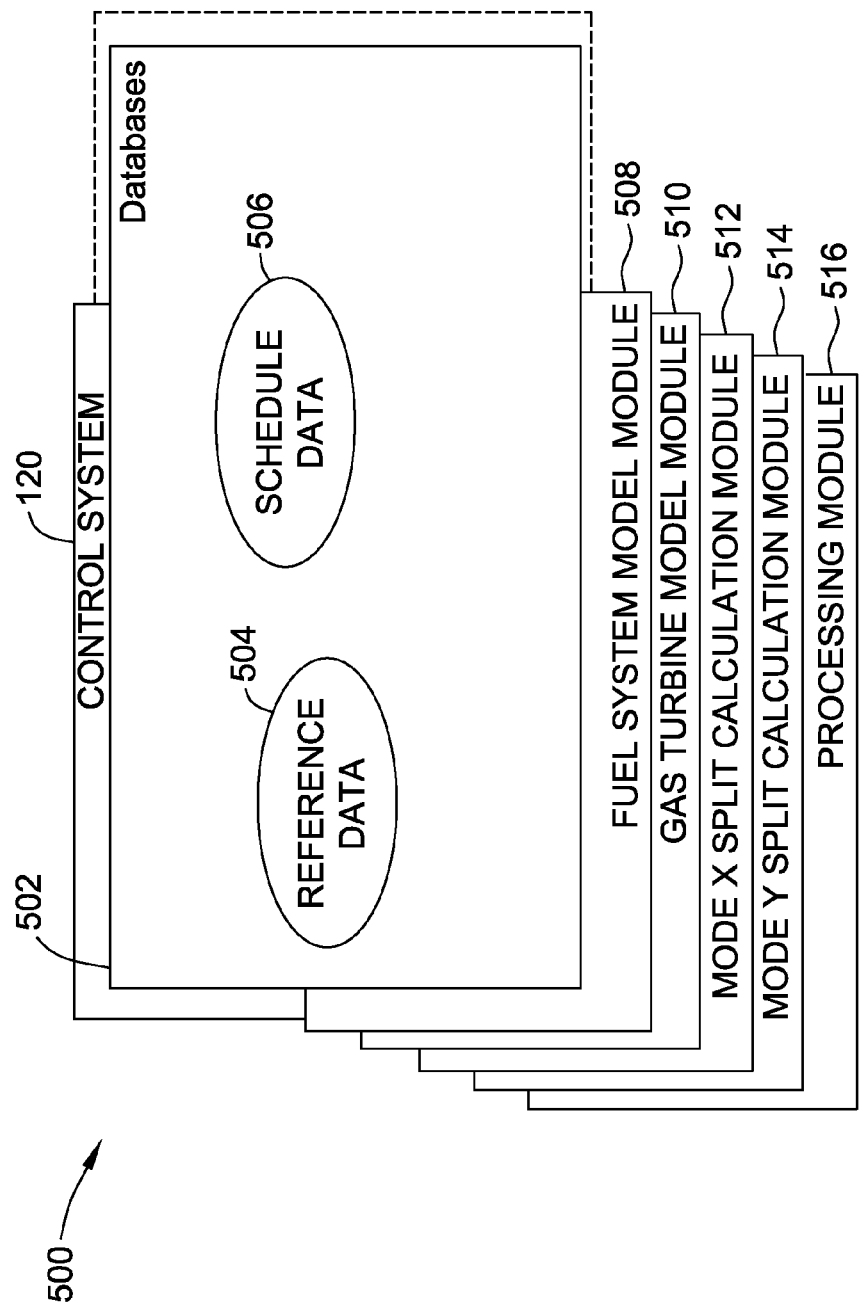
FIG. 5 is a diagram of example components included within the control system shown in FIG. 4.

In order to perform the functions described herein, control system 120 includes a plurality of functional components or modules within computing device 305 (shown in FIG. 4). In the exemplary embodiment, these functional components or modules are in the form of suitable programming stored in memory device 314 and performed using computing device 305. FIG. 5 is a diagram 500 of at least some functional components contained within control system 120 (shown in FIG. 4). For example, a database 502 may be used in controlling operation of gas turbine engine 100 (shown in FIG. 1). In the exemplary embodiment, control system 120 includes any number and type of databases 502 that enables control system 120 to function as described herein. Database 502 is coupled to several separate modules within computing device 305, which perform specific tasks as described in further detail herein below. In the exemplary embodiment, database 502 is divided into a plurality of sections, including but not limited to, a reference data section 504 and a schedule data section 506. In the exemplary embodiment, database 502 includes any number and type of sections that enables control system 120 to function as described herein. Sections 504 and 506 may be interconnected to retrieve information pertaining to the operations and components described below. For example, reference data section 504 may include various reference numerical values, such as reference manifold exhaust temperatures that are used to determine when a shift from one combustion mode to another combustion mode is called for. Schedule data section 506 may include schedules of fuel/air ratios (also referred to herein as "splits") used to define amounts of fuel and air supplied, for example, to each of fuel/air nozzles 202-212 (shown in FIG. 2).

Control system 120 (shown in FIG. 5) may include other functional components including, but not limited to, a fuel system model module 508, a gas turbine model module 510, a first ("mode X") split calculation module 512, a second ("mode Y") split calculation module 514, and a general processing module 516. Fuel system model module 508 determines initial splits to supply to combustor assembly 104 of gas turbine engine 100, prior to implementation of engine operation under combustion direct boundary control. Module 508 determines the initial splits based on one or more actual real-time parameters of gas turbine engine 100. In the exemplary embodiment, one or more sensors (not shown), such as differential pressure transducers, provide data to computing device 305 representative of a pressure within an exhaust gas manifold (not shown) of gas turbine engine 100. Using the pressure data, module 508 refers to a split schedule (not shown) stored, for example, in memory device 314 (shown in FIG. 4) to determine appropriate splits to supply to combustor assembly 104. These splits can eventually influence command signals sent to various gas turbine engine actuators (not shown), such as command signals to gas control valves.

Gas turbine model module 510 develops and continually updates a mathematical model of gas turbine 100 during engine operation. Module 510 receives input signals 736 from various sensors 440 that represent values such as, but are not limited to, exhaust manifold temperature, compressor pressure, compressor temperature, output of load 112 (shown in FIG. 1) such as generator output, fuel flow, and inlet air temperature. Sensors 440 may be the same sensors as sensors 350 shown in FIG. 4. Using these values, module 510 generates estimated numerical values for current operating conditions within gas turbine 100 that may not otherwise be directly observable, including, but not limited to, estimated emissions, engine dynamics, and temperatures and pressures at locations within gas turbine engine 100 where sensors cannot be placed and operate reliably, such as combustor temperatures and pressures.

Split calculation module 512 represents a series of mathematical processes and calculations that result in the generation of data corresponding to a set of splits corresponding to a first combustion mode. In the exemplary embodiment, the first combustion mode may be any desired combustion mode, for example, mode X, which may be associated with a set of fuel and air splits corresponding to a first load condition. More specifically, as described herein, module 512 is actually capable of calculating splits corresponding to a plurality of parameter boundaries associated with combustion mode X in which gas turbine engine 100 is capable of operation. However, as described in further detail herein below, only one set of splits, corresponding to at least one predetermined combustion parameter boundary of combustion mode X is selected by control system 120 as an ultimate output of module 512. Split calculation module 514 represents a series of mathematical processes and calculations that result in the generation of a set of splits corresponding to a second combustion mode, which, in the exemplary embodiment, may be any mode other than the mode selected by control system 120 to be the output of module 512, for example, mode Y, which may be associated with a set of fuel and air splits corresponding to a second load condition. Module 514 likewise is capable of calculating splits corresponding to a plurality of parameter boundaries associated with combustion mode Y in which gas turbine engine 100 is capable of operating.

As described hereinabove, depending upon which of modules 512 and 514 is operating in the "active control regime" and which is operating in the "passive control regime," the output of one of modules 512 will be a set of splits (referred to as "control splits") that are actually being used to control flow of fuel, air, etc. within gas turbine engine 100, while the output of the other of modules 514 (also "control splits") are used as a feedback, such that the module that is in the passive control regime is continuously producing splits that are current or "valid" for the prevailing operating conditions within gas turbine engine 100.

In the exemplary embodiment, control system 120 includes two split calculation modules 512 and 514. In an alternative embodiment, control system 120 may include any number of split calculation modules that enables gas turbine system 101 to function as described herein. Moreover, control system 120 may include any number and type of other modules that may be needed to enable control system 120 to function as described herein. In addition, each of the modules described herein may include further functional components within them. For example, in the exemplary embodiment, each of modules 512 and 514 includes further functional components within them, including a first logic node, a transfer function calculation node, a processing node, and a priority selection node, as described in further detail herein below.

Figure 6:
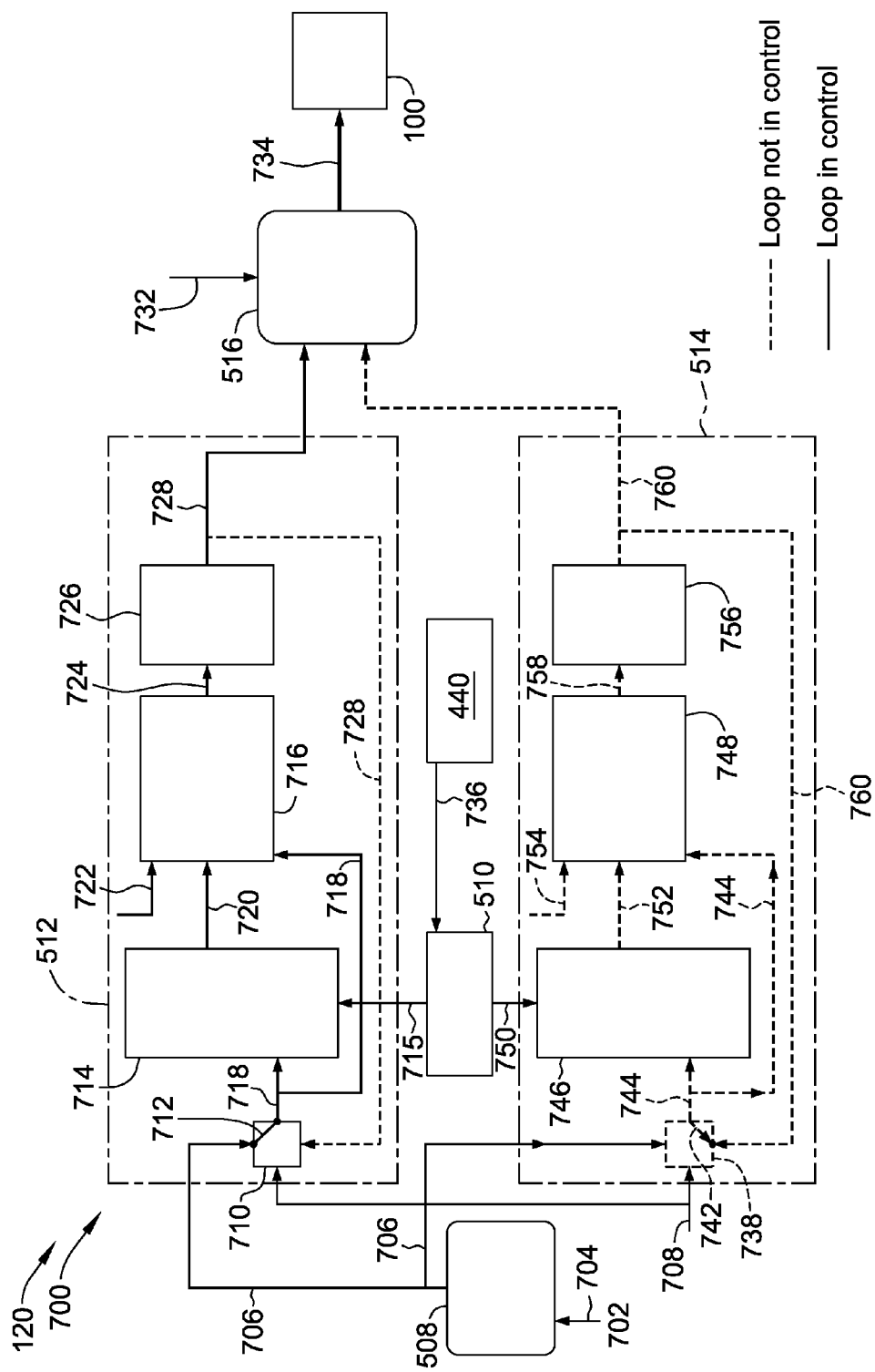
FIG. 6 is schematic topological diagram of an exemplary method for transferring between combustion modes.

FIG. 6 is a topological chart 700 illustrating information flow between modules 508, 510, 512, 514, and 516, during combustion direct boundary control of gas turbine engine 100 (shown in FIG. 1), and in particular, showing how transfers between combustion modes are enabled while gas turbine engine 100 is operating under combustion direct boundary control. Control system 120, via module 508, receives, via one or more sensors 702, such as manifold differential pressure transducers, signals 704 representing a real-time pressure within an exhaust manifold (not shown) of gas turbine engine 100. After converting the signals to a pressure value, control system 120 determines from a split schedule (not shown) stored in memory device 314 (shown in FIG. 3) a set of initial splits. In the exemplary embodiment, control system 120 may store in memory device 314, initial split schedules corresponding to each combustion mode in which gas turbine engine 100 is capable of operation. In another alternative, control system 120 may maintain a split schedule for use that simply correlates splits to specific pressure values without regard to combustion mode. In still another alternative, control system 120 may use any split schedule to derive initial splits from, that enables gas turbine system 101 to function as described herein. Control system 120 transmits a data signal 706 corresponding to the initial splits simultaneously to modules 512 and 514. In the exemplary embodiment shown in FIG. 6, gas turbine engine is under mode X control, either as a default (such as during start-up), or through mode X having been previously selected by control system 120.

As previously described, each of modules 512 and 514 further includes a first logic node, a transfer function calculation node, a processing node, and a priority selection node. Specifically, module 512 includes a logic node 710, at least one transfer function calculation node 714, at least one processing node 716, and a priority selection node 726. Similarly, module 514 includes a logic node 738, at least one transfer function calculation node 746, at least one processing node 748, and a priority selection node 756. In the exemplary embodiment, the respective nodes within modules 512 and 514 perform similar types of calculations, as described above. However, the calculations performed within module 512 are focused on splits within combustion mode X, while the calculations performed within module 514 are focused on splits within combustion mode Y.

For example, control system 120 in FIG. 6 is configured such that module 512 is operating in the active control regime in combustion mode X and module 514 is operating in the passive control regime in combustion mode Y. Accordingly, in module 512, mode decision signal 708 (implemented, e.g., via module 516) configures node 710 such that data signal 706 transmitted by control system 120 from module 508 is transmitted via link 712 as an input to node 714. In contrast, because module 514 is operating in the passive control regime, mode decision signal 708 configures node 738 to receive a signal 760, which is an output of node 756, and transmit it, via link 742, as an input signal 744 to node 746.

Nodes 714 and 746 represent portions of control system 120 that are suitably programmed to receive as inputs signals corresponding to splits. Nodes 714 and 746 additionally receive as inputs signals 715 and 750, respectively, which are transmitted from module 510. As previously described, module 510 generates a mathematical model of gas turbine engine 100. Accordingly, module 510 serves as a "mathematical" sensor, producing data representing real-time current operating conditions prevailing within gas turbine engine 100. Each of nodes 714 and 746 represents a series of mathematical processes and/or calculations that result in the generation of data corresponding to a set of predicted operating parameters for gas turbine engine 100 that, in turn, may be used to calculate splits corresponding to combustion modes. This data is embodied in output signals 720, 752, transmitted from nodes 714, and 746, respectively. Each of modules 512 and 514 processes their respective inputs and generates a plurality of sets of splits, embodied as output signals 728 and 760, respectively, wherein each set of splits corresponds to a potential combustion mode of gas turbine engine 100.

When module 512 is operating in the active control regime, as shown in FIG. 6, processing node 716 receives as inputs initial split signal 718, one or more signals 720 transmitted from node 714, and an equivalent number of reference signals 722 that are retrieved, e.g., from memory device 314 (shown in FIG. 2). Reference signal 722 includes data representing target numerical values for various parameters that have been predefined as controlling parameters for combustion operations. As module 514 is operating in the passive control regime as shown in FIG. 6, processing node 748 receives as inputs control split signal 744, one or more signals 752 transmitted from node 746, and an equivalent number of reference signals 754. In the exemplary embodiment, reference signal 754 may be identical to reference signal 722. That is, it is understood that "signals" 720, 722, 724, 752, 754, and 758, may, in an embodiment, each represent a group or set of signals, rather than a single signal.

Nodes 716 and 748, using their respective inputs as described above, generate pluralities of sets of splits, each set corresponding to a predetermined combustion parameter boundary of combustion mode X or Y, respectively, available to gas turbine engine 100. Accordingly, nodes 716 and 748 generate output signals 724 and 758, respectively, each of which includes data corresponding to each of the sets of splits generated respectively by nodes 716 and 748. Priority selection nodes 726 and 756 receive respective signals 724 and 758 and apply selection logic, to downselect as outputs, signals including data that corresponds to particular combustion parameter boundaries for combustion modes X and Y that control system 120 has determined should be applied and that correspond to the active and passive control regimes. For example, presuming that in the exemplary embodiment, control system 120 has determined that gas turbine engine 100 should operate in mode X as the active control regime, with a particular combustion parameter boundary A as the controlling parameter, then priority selection node 726 downselects from signal 724, data corresponding to mode X, combustion parameter boundary A splits and transmits that data as output signal 728, which is transmitted both to module 516, and to first logic node 710. Correspondingly, as module 514 is in the passive control regime as determined by control system 120, control system 120 causes priority selection node 756 to select from signal 758 data corresponding to a combustion mode Y, combustion parameter boundary B (which may or may not be the same controlling combustion parameter boundary being used in active control) and transmits that data as output signal 760. Signal 760 is transmitted both to module 516 and first logic node 738. Accordingly, each module 512 and 514 continuously determines a steady state solution for a set of splits, embodied in signals 728 and 760, to be provided to gas turbine engine 100, via signal 734 transmitted from module 516, corresponding to a different combustion mode and/or controlling combustion parameter boundary, with signal 728 actively controlling gas turbine engine 100, and signal 760 being passive and available to be provided to gas turbine engine 100, for use when control system 120 determines that a transfer between combustion modes is called for. Specifically, signal 760 serves as a prediction of valid steady state splits for the "destination" combustion mode to be transferred into.

In the exemplary embodiment, nodes 716 and 748 are illustrated as single or individual nodes. In an alternative embodiment (not shown), each node 716, 748 may be replaced by a plurality of nodes, the signals from which are channeled to priority selection nodes 726, 756, respectively, wherein the pluralities of nodes represent different controlling combustion parameter boundaries for a single common combustion mode.

As previously described, split calculations performed via module 512 actively control splits in the pre-transfer combustion mode, and so the current measurements used for direct boundary control, or used as inputs to the models to generate direct boundary estimates, are valid prior to the combustion mode transfer. As previously described, the splits calculated via module 514 are not, at least initially as described herein, in control of the gas turbine prior to the mode transfer, and as such is using as an input, a self-generated set of control split data. Split calculations performed via module 514 use the output split as an input to one or more transfer functions that model the required split calculation inputs. In this configuration, module 514 performs an interation to determine an estimate of the desired split as if gas turbine engine 100 were operating in the second combustion mode. System 120 is configured to perform the foregoing calculations so as to converge on a final solution prior to the combustion mode transfer, so that the split calculation performed via module 514 can be used to determine the desired final post-transfer split just prior to the initiation of the combustion transfer.

In the exemplary embodiment, decision signal 732 may be generated by system 120 and transmitted to processing module 516, for implementing determinations by control system 120 regarding when a transfer from one combustion mode to another is called for. For example, control system 120 may monitor a predetermined mode transfer criterion or set of criteria, for example an operating parameter, such as exhaust manifold temperature. When a predetermined threshold of the operating parameter is crossed (either upwardly or downwardly), control system 120 generates signal 732, received by module 516, to cause a change between combustion modes by, as shown in FIG. 6, terminating transmission of signal 728 to gas turbine engine 100, and instead transmitting signal 760 to gas turbine engine 100. Links 712 and 742 are switched, such that node 710 receives as input signal 728 for transmittal to node 714, and node 738 receives as input data signal 706 for transmittal to node 746. In the exemplary embodiment, control system 120 is configured to cause a smooth transfer between the active splits of signal 728 and the previously-passive splits of signal 760. Output signal 760 of module 514, when operating in the passive control regime, provides a set of splits that serves as the initial splits or "landing spot" for initiation of active control during a switch from combustion mode X (previously actively controlled via module 512) to combustion mode Y (previously passively controlled via module 514).

More specifically, as previously described, without a mechanism for effectuating the controlled physical transfer between combustion modes, operation of gas turbine engine 100 may be adversely affected. In one exemplary embodiment, operation of gas turbine engine 100 may continue using pre-transfer splits generated by module 512 until initiation of a combustion mode transfer, e.g., from mode X to mode Y. After system 120 determines that conditions for a combustion mode transfer have been met, the pre- and post-transfer split values could be statically captured prior to initiation of the combustion mode transfer. System 120 initiates a combustion mode transfer by implementing a rate limited change between the static pre- and post-transfer splits. In an exemplary embodiment, system 120 may be configured to calculate, e.g., via module 516, the rate limited change based on one or more initial numerical value differences between one or more corresponding pairs of the pre and post-transfer splits. The differences between the numerical values of the corresponding pairs of the pre and post-transfer splits may be captured at the initiation of the combustion mode transfer. This numerical difference (or differences) could then be ramped (e.g., incrementally changed) to zero at a given rate, or over a given finite time, and added to the post-transfer calculated split. During the combustion mode transfer the post-transfer calculated split may be continuously calculated in passive mode since it does not require gas turbine engine 100 to operate in the combustion mode for calculation of the passive regime splits. Once the difference is ramped to zero and the related measurements fully reflect operation of gas turbine engine 100 in new combustion mode Y, then combustion direct boundary control operation of gas turbine engine 100 can be resumed utilizing splits calculated via module 514, now operating in active mode. The foregoing actions for transferring between combustion modes are exemplary only, and in other embodiments, other actions and calculations may be performed, to enable the system to function as described herein.

In the exemplary embodiment, control system 120 is described as transferring between two combustion modes, X and Y. In an alternative embodiment, control system 120 may be capable of transferring between any number of combustion modes that may be desired. Accordingly, in such an embodiment, control system 120 would include as many combustion transfer mode modules as there would be combustion modes available to gas turbine engine 100. The mode selection logic functions shown at 710, and 738 may be performed by processing module 516. The foregoing operations may take place during any phase of operation of gas turbine engine 100, including during start-up, steady-state, and slow-down phases of operation.

By providing at least two modules 512 and 514, control system 120 can continuously determine what appropriate splits should be implemented for transfers between at least two combustion modes, if control system 120 determines that a change in combustion mode is called for, at any time during combustion direct boundary control operation of gas turbine engine 100. Accordingly, control system 120 is not required to refer to extensive split schedules that would otherwise have to be developed and maintained in memory device 314 (shown in FIG. 4). Additionally, using direct boundary control actively throughout the combustion mode transfer provided more robust control of splits to prevent violation of any combustion parameter boundary limits.

The methods and systems described herein address at least some of the disadvantages of known gas turbine systems. For example, the methods and systems described herein facilitate transfers between combustion modes with reduced reliance upon predetermined split schedules. In addition, the methods and systems described herein facilitate the operation of gas turbine combustors over an increased range of operating conditions and load paths, instead of being constrained to operate along a limited number of fixed predetermined load paths. The methods and systems described herein further facilitate the use of combustion direct boundary control in a plurality of combustor operation modes, with reduced interruptions in active combustion direct boundary control operation. More specifically, the methods and systems described herein provide for robust transfers between combustion modes while still in active control of the gas turbine engine. In addition, the methods and systems described herein facilitate improved transfers between combustion modes without additions to and/or modifications of existing gas turbine engine control hardware.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspects are not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable medium" refers to any medium or signal used to provide machine instructions and/or data to a programmable processor. The "machine-readable medium" and "computer-readable medium," however, do not include transitory signals.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

The methods and systems described herein may be implemented by a computing device in communication with a memory device, using computer programming or engineering techniques including computer software, firmware, hardware or any combination or subset thereof, wherein the technical effects are achieved by performing at least one of the following actions: a) generating data representative of an initial set of splits for providing at least one of fuel and air to at least one combustor in the gas turbine engine; b) generating a model of the gas turbine engine, wherein the gas turbine engine model generates as an output data representative of at least one operating condition within the gas turbine engine; c) generating data representative of at least one set of active control splits for use in controlling the gas turbine engine in a first combustion mode, using as an input the initial split data; and d) generating data representative of at least one set of passive control splits for use in controlling the gas turbine engine in at least a second combustion mode, using as an input, a self-generated set of control split data.

The technical effects may also be achieved by performing at least one of the following actions: a) generating data representative of a plurality of sets of active control splits corresponding to a plurality of combustion parameter boundary values; b) selecting data representative of a set of active control splits corresponding to at least one of the combustion parameter boundary values; c) receiving and selectively retransmitting the initial split data; d) generating, with a transfer function calculation node data representative of a set of predicted operating parameters for use in calculating one or more splits based on at least one combustion parameter boundary value; e) generating data representative of a plurality of sets of active control splits based on the at least one first combustion parameter boundary value; f) selecting a set of active control split data from the plurality of sets of active control splits corresponding to a selected at least one combustion parameter boundary value; g) transmitting the selected active control split data to the gas turbine engine and to the first logic node; and h) transferring between combustion modes after the computing device determines that a threshold of a monitored operating condition exceeds a predetermined threshold value.

The technical effects may also be achieved by performing at least one of the following actions: a) implementing a rate limited change between static pre- and post-transfer splits; b) calculating the rate limited change based on one or more initial numerical value differences between one or more corresponding pairs of the pre and post-transfer splits; c) capturing the differences between the numerical values of the corresponding pairs of the pre and post-transfer splits at initiation of a combustion mode transfer; l) ramping (e.g., incrementally changing) the difference to zero at a given rate, or over a given finite time, and adding the ramped difference to the post-transfer calculated split; d) continuously calculating the post-transfer split in the passive combustion mode; and e) resuming combustion direct boundary control operation after the difference has been ramped to zero and the related measurements fully reflect operation of the gas turbine engine in the new combustion mode, which is now the active mode.

This written description uses examples to disclose the claimed subject matter, including the best mode, and also to enable any person skilled in the art to practice the claimed subject matter, including making and using any devices or systems and performing any incorporated methods. The patentable scope of the subject matter described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in transferring between combustion modes during operation of a gas turbine engine, said method implemented using a computing device including a processor coupled to a memory device, said method comprising:

receiving, by the computing device, real-time sensor data from at least one sensor coupled to the gas turbine engine;

generating, by the computing device using the real-time sensor data, data representative of an initial set of splits for providing at least one of fuel and air to at least one combustor in the gas turbine engine;

generating, by the computing device using the real-time sensor data, a model of the gas turbine engine, wherein the gas turbine engine model generates as an output data representative of at least one operating condition within the gas turbine engine;

operating the gas turbine engine in a first combustion mode using at least one set of active control splits;

generating, during operation of the gas turbine engine in the first combustion mode, by a first split calculation module within the computing device using the model output data and the initial split data, data representative of the at least one set of active control splits for use in controlling the gas turbine engine in the first combustion mode;

generating, during operation of the gas turbine engine in the first combustion mode, by at least a second split calculation module within the computing device using the model output data and a feedback signal selected from at least one set of passive control splits, data representative of the at least one set of passive control splits associated with at least a second combustion mode of the gas turbine engine; and transferring, by the computing device, operation of the gas turbine engine to the second combustion mode using the at least one set of passive control splits generated during operation in the first combustion mode.

2. The method in accordance with claim 1, wherein generating data signal representative of at least one set of active control splits comprises generating, with the first split calculation module, data representative of a plurality of sets of active control splits corresponding to a plurality of combustion parameter boundary values.

3. The method in accordance with claim 2, wherein said method comprises selecting, with the computing device, data representative of a set of active control splits corresponding to at least one of the combustion parameter boundary values.

4. The method in accordance with claim 1, wherein generating, with a first split calculation module within the computing device, data representative of at least one set of active control splits comprises:

receiving and selectively retransmitting, with a first logic node, the initial split data;

generating, with a transfer function calculation node selectively coupled to the first logic node and coupled to the gas turbine model module, data representative of a set of predicted operating parameters for use in calculating one or more splits based on at least one predetermined combustion parameter boundary value;

generating, with a processing node selectively coupled to the first logic node and coupled to the transfer function calculation node, data representative of a plurality of sets of active control splits based on the at least one first predetermined combustion parameter boundary value;

selecting, with a priority selection node coupled to the processing node, a set of active control split data from the plurality of sets of active control splits corresponding to a selected at least one combustion parameter boundary value; and transmitting, with the priority selection node, the selected active control split data to the gas turbine engine and to the first logic node.

5. The method in accordance with claim 1, wherein said transferring between combustion modes is performed after the computing device determines that a threshold of a monitored operating condition exceeds a predetermined threshold value.

6. The method in accordance with claim 5, wherein said transferring between combustion modes comprises utilizing active control splits captured at a beginning of the combustion mode transfer and passive control splits continuously calculated during the combustion mode transfer, such that the active control splits at the beginning of the transfer are incrementally adjusted to approach the passive control splits.

7. The method in accordance with claim 1, wherein generating, by a second split calculation module within the computing device, data representative of at least one set of passive control splits comprises:

generating, with a transfer function calculation node selectively coupled to a first logic node and coupled to the gas turbine model module, data representative of a set of predicted operating parameters for use in calculating splits based on at least one predetermined combustion parameter boundary value;

generating, with a processing node selectively coupled to the first logic node and coupled to the transfer function calculation node, data representative of a plurality of sets of passive control splits based on the at least one predetermined combustion parameter boundary value;

selecting, with a priority selection node coupled to the processing node, a set of passive control split data from the plurality of sets of active control splits corresponding to a selected at least one combustion parameter boundary value;

transmitting, with the priority selection node, the selected passive control split data to the first logic node; and receiving and selectively retransmitting, with the first logic node, the selected passive control split data to the transfer function calculation node and the processing node.

8. The method in accordance with claim 1, wherein said method comprises:

receiving, with a second logic node, the active control split data and the passive control split data; and controlling the gas turbine engine using the active control split data.

9. The method in accordance with claim 1, wherein transferring operation of the gas turbine engine to the second combustion mode comprises:

selectively controlling the gas turbine engine using the passive control split data;

converting the first split calculation module from an active control regime to a passive control regime; and converting the second split calculation module from a passive control regime to an active control regime.

10. A system for transferring between combustion modes in a gas turbine engine, said system comprising:

a computing device including a processor; and a computer-readable storage device having encoded thereon computer-readable instructions that are executable by said processor to perform functions comprising:

receiving real-time sensor data from at least one sensor coupled to the gas turbine engine;

generating, using the real-time sensor data, data representative of an initial set of splits for providing at least one of fuel and air to at least one combustor in the gas turbine engine;

generating, using the real-time sensor data, a model of the gas turbine engine, wherein the gas turbine engine model generates as an output data representative of at least one operating condition within the gas turbine engine;

operating the gas turbine engine in a first combustion mode using at least one set of active control splits;

generating, during operation of the gas turbine engine in the first combustion mode, by a first split calculation module within said computing device using the model output data and the initial split data, data representative of the at least one set of active control splits for use in controlling the gas turbine engine in the first combustion mode;

generating, during operation of the gas turbine engine in the first combustion mode, by at least a second split calculation module within said computing device using the model output data and a feedback signal selected from at least one set of passive control splits, data representative of the at least one set of passive control splits associated with at least a second combustion mode of the gas turbine engine; and transferring operation of the gas turbine engine to the second combustion mode via utilization of active control splits captured at a beginning of a combustion mode transfer and passive control splits continuously calculated during the combustion mode transfer, such that the active control splits at the beginning of the transfer are incrementally adjusted to approach the passive control splits.

11. The system in accordance with claim 10, wherein the computer-executable instructions cause said processor to generate, with the first split calculation module, data representative of a plurality of sets of active control splits corresponding to a plurality of combustion parameter boundary values.

12. The system in accordance with claim 11, wherein the computer-executable instructions cause said processor to select a set of active control split data from the plurality of sets of active control splits corresponding to a selected at least one combustion parameter boundary value.

13. The system in accordance with claim 10, wherein the computer-executable instructions cause said processor to:
receive, with a second logic node, the active control split data and the passive control split data; and
control the operation of the gas turbine engine using the active control split data.

14. The system in accordance with claim 13, wherein the computer-executable instructions cause said processor to:
monitor at least one operating condition within the gas turbine engine; and
transfer control of the gas turbine engine from the first combustion mode to the second combustion mode, when the monitored operating condition crosses a predetermined threshold value.

15. The system in accordance with claim 14, wherein the computer-executable instructions cause said processor to:
selectively control the gas turbine engine using the passive control split data;
convert the first split calculation module from an active control regime to a passive control regime; and
convert the second split calculation module from a passive control regime to an active control regime.

16. The system in accordance with claim 15, wherein the computer-executable instructions cause said processor to reconfigure the first split calculation module to use as an input a feedback signal selected from at least one set of control splits generated by the first split calculation module.

17. The system in accordance with claim 15, wherein the computer-executable instructions cause said processor to reconfigure the second split calculation module to use as an input the initial split data.

18. A gas turbine system, said system comprising:
a compressor section;
a combustor assembly coupled to said compressor section;
a turbine section coupled to said compressor section, and
a control subsystem, wherein said control subsystem includes:
a computing device including a processor; and
a computer-readable storage device having encoded thereon computer-readable instructions that are executable by said processor to perform functions comprising:
receiving, by the computing device, real-time sensor data from at least one sensor coupled to said gas turbine system;
generating, using the real-time sensor data, data representative of an initial set of splits for providing at least one of fuel and air to at least one combustor of said combustor assembly;
generating a model of the gas turbine system, wherein the gas turbine system model generates as an output data representative of at least one operating condition within the gas turbine system;
operating the gas turbine system in a first combustion mode using at least one set of active control splits;
generating, during operation of the gas turbine system in the first combustion mode, by a first split calculation module within said computing device using the model output data and the initial split data, data representative of the at least one set of active control splits for use in controlling the gas turbine system in the first combustion mode;
generating, during operation of the gas turbine system in the first combustion mode, by at least a second split calculation module within said computing device using the model output data and a feedback signal selected from at least one set of passive control splits, data representative of the at least one set of passive control splits associated with at least a second combustion mode of the gas turbine system; and
transferring operation of the gas turbine engine to the second combustion mode after the computing device determines that a threshold of a monitored operating condition exceeds a predetermined threshold value.

19. The gas turbine system in accordance with claim 18, wherein the computer-executable instructions cause said processor to implement a rate limited change between the active control splits and the passive control splits, such that the active control splits are incrementally adjusted to approach the passive control splits.

* * * * *